(12) United States Patent
Yuan et al.

(10) Patent No.: US 12,462,769 B2
(45) Date of Patent: Nov. 4, 2025

(54) ARRAY SUBSTRATE AND DISPLAY PANEL

(71) Applicants: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

(72) Inventors: Kaixuan Yuan, Guangdong (CN); Mengmeng Hu, Guangdong (CN); Wenying Li, Guangdong (CN); Yi Li, Guangdong (CN)

(73) Assignees: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/569,234

(22) PCT Filed: Oct. 11, 2023

(86) PCT No.: PCT/CN2023/124116
§ 371 (c)(1),
(2) Date: Dec. 12, 2023

(87) PCT Pub. No.: WO2024/198302
PCT Pub. Date: Oct. 3, 2024

(65) Prior Publication Data
US 2025/0087179 A1    Mar. 13, 2025

(30) Foreign Application Priority Data
Mar. 31, 2023   (CN) .......................... 202310383123.7

(51) Int. Cl.
*G09G 3/36* (2006.01)
*G09G 3/00* (2006.01)

(52) U.S. Cl.
CPC ........... *G09G 3/3677* (2013.01); *G09G 3/006* (2013.01); *G09G 2330/12* (2013.01)

(58) Field of Classification Search
CPC .......... G06F 1/20; G06F 1/189; G06F 1/1601; G06F 1/181; H10D 86/441; H10D 86/60
See application file for complete search history.

(56) References Cited

U.S. PATENT DOCUMENTS

2014/0078124 A1* 3/2014 Chen .................... G09G 3/3696
345/205
2016/0189794 A1* 6/2016 Lou ...................... G09G 3/3266
345/100

(Continued)

FOREIGN PATENT DOCUMENTS

| CN | 111919164 A | * | 11/2020 | ......... G02F 1/13338 |
| CN | 113589596 A | * | 11/2021 | ............ G02F 1/1339 |
| WO | WO-2015007052 A1 | * | 1/2015 | ............. G02F 1/133 |

*Primary Examiner* — Shaheda A Abdin
(74) *Attorney, Agent, or Firm* — PV IP PC; Wei Te Chung

(57) ABSTRACT

An array substrate and a display panel are provided. The array substrate includes a display area and a non-display located around the display area. The non-display area includes a GOA drive circuit region, a GOA busline region, a fan-out region, and a bonding region arranged successively in a direction away from the display area. The fan-out region includes at least one first GOA signal line group and multiple source fan-out line groups. The first GOA signal line group is arranged between an adjacent pair of the source fan-out line groups and includes at least multiple CK lines.

16 Claims, 6 Drawing Sheets

(56) References Cited

U.S. PATENT DOCUMENTS

2017/0193914 A1* 7/2017 Heo ................ H10K 59/10
2022/0026966 A1* 1/2022 Cao ..................... G06F 1/20

* cited by examiner

ARRAY SUBSTRATE AND DISPLAY PANEL

TECHNICAL FIELD

The present application relates to a field of display technology, and in particular, to an array substrate and a display panel.

DESCRIPTION OF RELATED ART

Currently, the Gate Driver on Array (GOA) technology on array substrates is commonly employed to manufacture display panels. GOA circuits refer to scan line drive circuits that are directly fabricated on the array substrate. The GOA circuit includes multiple cascaded shift registers, with each shift register driving a scan line and providing an activation (turn-on) signal for the next-stage shift register. This allows the GOA circuit as a whole to achieve the sequential activation of the scan lines. Placing the GOA circuit on a source side of the panel (GOA in Source, also known as row driving from a panel's source side), results in a panel with three narrow sides and one wide side, which can be used for three-sided splicing. Due to its significant cost advantages compared to existing products, this technology has garnered widespread attention in the industry in recent years.

The GOA in Source product requires the design of bus lines and the GOA circuit on the source side to reduce the width on the other three sides. Typically, the "GOA in Source" design involves introducing the GOA signals into the bus lines on the source side first. In the array substrate 1' shown in FIG. 1, the GOA timing signals, including the clock signal (CK), are routed into the bus lines on the source side through traces 2' from the side of the outer two Chip on Films (COF) near the border. However, this design results in a significant occupation of border space by the GOA timing signal lines, leading to an increase in the width of the border on the source side and two sides, which is not conducive to achieving a narrow border/bezel design.

SUMMARY OF INVENTION

The present application provides an array substrate and a display panel that can further reduce a width of a border on a source side.

In one aspect, the present application provides an array substrate, including a display area and a non-display area surrounding the display area, wherein the non-display area consists of a gate-driver-on-array (GOA) drive circuit region, a GOA busline region, a fan-out region, and a bonding region, all positioned on a same side of the display area and sequentially arranged in a direction away from the display area; the bonding region includes multiple bonding line groups spaced apart in succession along a first direction; the fan-out region includes multiple source fan-out line groups and at least one first GOA signal line group; the source fan-out line groups are arranged in a one-to-one correspondence with the bonding line groups and are electrically connected to the bonding line groups; the GOA drive circuit region includes at least one GOA drive circuit; and the GOA busline region includes a first GOA busline line group which extends along the first direction and is electrically connected to the at least one GOA drive circuit;

wherein each of the at least one first GOA signal line group is positioned only between adjacent source fan-out line groups, where one end of the first GOA signal line group is electrically connected to adjacent one or two of the bonding line groups, the other end of the first GOA signal line group is electrically connected to the first GOA busline line group, and the first GOA signal line group at least includes multiple clock signal (CK) lines.

In the array substrate of the present application, one of the first GOA signal line groups is arranged between any adjacent pair of the source fan-out line groups.

In the array substrate of the present application, each of the at least one first GOA signal line group includes a first CK line group and a second CK line group; in the same first GOA signal line group, the first CK line group and the second CK line group are electrically connected in a one-to-one correspondence to two adjacent ones of the bonding line groups;

the first GOA busline line group includes a first CK bus line group and a second CK bus line group; each first CK line group is electrically connected to the first CK bus line group; and each second CK line group is electrically connected to the second CK bus line group.

In the array substrate of the present application, the first CK line group includes multiple first CK lines, the second CK line group includes multiple second CK lines, and a number of the first CK lines is equal to a number of the second CK lines; and the first CK bus line group includes multiple first CK bus lines, the second CK bus line group includes multiple second CK bus lines, the first CK lines are electrically connected in a one-to-one correspondence to the first CK bus lines, and the second CK lines are electrically connected in a one-to-one correspondence to the second CK bus lines.

In the array substrate of the present application, the fan-out region further includes at least one second GOA signal line group; the source fan-out line groups include a first side and a second side arranged opposite to each other in the first direction; the second GOA signal line group is disposed on either the first side or the second side; the GOA busline line groups further include a second GOA busline line group which extends along the first direction and is electrically connected to the corresponding GOA drive circuit; one end of the second GOA signal line group is electrically connected to the adjacent bonding line group, and another end of the second GOA signal line group is electrically connected to the second GOA busline line group; and the second GOA signal line group includes at least a low voltage (VSS) line, a start trigger signal (STV) line, a reset signal line, and a low-frequency clock signal (LC) line.

In the array substrate of the present application, the array substrate further includes a cutting region located on one side of the bonding region away from the display area, the cutting region includes multiple test pad units which are structurally identical and are successively spaced along the first direction; each adjacent pair of the bonding line groups is arranged corresponding to and is electrically connected to one test pad unit;

the test pad units include a first test pad group and a second test pad group which are spaced and arranged along the first direction, a first lead group and a second lead group which are electrically connected to the first test pad group, and a third lead group electrically connected to the second test pad group; the first lead group extends from one side of the first test pad group near the bonding region; the second lead group extends from one side of the first test pad group away from the bonding region; and the third lead group extends from one side of the second test pad group near the bonding region;

at least one of the bonding line groups is electrically connected to the corresponding first test pad group through the adjacent first lead group, at least one of the bonding line groups is electrically connected to the corresponding first test pad group through the adjacent second lead group; and at least one of the bonding line groups is electrically connected to the corresponding second test pad group through the adjacent third lead group.

In the array substrate of the present application, the first test pad group includes a first sub-test pad group and a second sub-test pad group; the second sub-test pad group is located between the first sub-test pad group and the second test pad group; the first lead group includes a first sub-lead group connected to the first sub-test pad group and a second sub-lead group connected to the second sub-test pad group; the second lead group includes a third sub-lead group connected to the first sub-test pad group and a fourth sub-lead group connected to the second sub-test pad group;

each of the bonding line groups is electrically connected to the corresponding second sub-test pad group through the adjacent second sub-lead group or the adjacent fourth sub-lead group;

at least one of the bonding line groups is electrically connected to the corresponding first sub-test pad group through the adjacent first sub-lead group or the adjacent third sub-lead group; and the first sub-test pad group includes at least one of a power supply voltage test pad, a low-frequency clock signal test pad, a first common electrode voltage test pad, and a start trigger signal (STV) test pad; and the second sub-test pad group is configured to connect source test signals.

In the array substrate of the present application, the second test pad group includes a first CK test pad group, a second common electrode voltage test pad, and a second CK test pad group which are sequentially spaced apart in the first direction; the third lead group includes a first CK line group, a common electrode voltage line, and a second CK line group which are respectively electrically connected to the first CK test pad group, the second common electrode voltage test pad, and the second CK test pad group; and every two adjacent ones of the bonding line groups are electrically connected one-to-one to the first CK line group and the second CK line group in the corresponding test pad unit.

In the array substrate of the present application, the source fan-out line groups include a first side and a second side arranged opposite to each other in the first direction; the fan-out region further includes second GOA signal line groups respectively located on the first side and the second side; the bonding line groups include a first bonding line group near the first side, a second bonding line group near the second side, and a plurality of third bonding line groups positioned between the first bonding line group and the second bonding line group;

the first bonding line group is electrically connected to the second GOA signal line group located on the first side and is electrically connected to the corresponding first sub-test pad group through the adjacent first sub-lead group; the second bonding line group is electrically connected to the second GOA signal line group located on the second side and is electrically connected to the corresponding first test pad group through the adjacent third sub-lead group; the first bonding line group and the third bonding line groups are electrically connected to the corresponding second sub-test pad group through the adjacent second sub-lead group; and the second bonding line group is electrically connected to the corresponding second sub-test pad group through the adjacent fourth sub-lead group.

In a second aspect, the present application further provides a display panel, including a counter substrate and an array substrate, wherein the array substrate includes a display area and a non-display area surrounding the display area, the non-display area consists of a gate-driver-on-array (GOA) drive circuit region, a GOA busline region, a fan-out region, and a bonding region, all positioned on a same side of the display area and sequentially arranged in a direction away from the display area; the bonding region includes multiple bonding line groups spaced apart in succession along a first direction; the fan-out region includes multiple source fan-out line groups and at least one first GOA signal line group; the source fan-out line groups are arranged in a one-to-one correspondence with the bonding line groups and are electrically connected to the bonding line groups; the GOA drive circuit region includes at least one GOA drive circuit; and the GOA busline region includes a first GOA busline line group which extends along the first direction and is electrically connected to the at least one GOA drive circuit;

wherein each of the at least one first GOA signal line group is positioned only between adjacent source fan-out line groups, where one end of the first GOA signal line group is electrically connected to adjacent one or two of the bonding line groups, the other end of the first GOA signal line group is electrically connected to the first GOA busline line group, and the first GOA signal line group at least includes multiple clock signal (CK) lines.

In the display panel of the present application, one of the first GOA signal line groups is arranged between any adjacent pair of the source fan-out line groups.

In the display panel of the present application, each of the at least one first GOA signal line group includes a first CK line group and a second CK line group; in the same first GOA signal line group, the first CK line group and the second CK line group are electrically connected in a one-to-one correspondence to two adjacent ones of the bonding line groups;

the first GOA busline line group includes a first CK bus line group and a second CK bus line group; each first CK line group is electrically connected to the first CK bus line group; and each second CK line group is electrically connected to the second CK bus line group.

In the display panel of the present application, the first CK line group includes multiple first CK lines, the second CK line group includes multiple second CK lines, and a number of the first CK lines is equal to a number of the second CK lines; and the first CK bus line group includes multiple first CK bus lines, the second CK bus line group includes multiple second CK bus lines, the first CK lines are electrically connected in a one-to-one correspondence to the first CK bus lines, and the second CK lines are electrically connected in a one-to-one correspondence to the second CK bus lines.

In the display panel of the present application, the fan-out region further includes at least one second GOA signal line group; the source fan-out line groups include a first side and a second side arranged opposite to each other in the first direction; the second GOA signal line group is disposed on either the first side or the second side; the GOA busline line groups further include a second GOA busline line group which extends along the first direction and is electrically connected to the corresponding GOA drive circuit; one end of the second GOA signal line group is electrically connected to the adjacent bonding line group, and another end of the second GOA signal line group is electrically connected to the second GOA busline line group; and the second GOA signal line group includes at least a low voltage (VSS) line, a start trigger signal (STV) line, a reset signal line, and a low-frequency clock signal (LC) line.

In the display panel of the present application, the array substrate further includes a cutting region located on one side of the bonding region away from the display area; the cutting region includes multiple test pad units which are structurally identical and are successively spaced along the first direction; each adjacent pair of the bonding line groups is arranged corresponding to and is electrically connected to one test pad unit;

the test pad units include a first test pad group and a second test pad group which are spaced and arranged along the first direction, a first lead group and a second lead group which are electrically connected to the first test pad group, and a third lead group electrically connected to the second test pad group; the first lead group extends from one side of the first test pad group near the bonding region; the second lead group extends from one side of the first test pad group away from the bonding region; and the third lead group extends from one side of the second test pad group near the bonding region;

at least one of the bonding line groups is electrically connected to the corresponding first test pad group through the adjacent first lead group, at least one of the bonding line groups is electrically connected to the corresponding first test pad group through the adjacent second lead group; and at least one of the bonding line groups is electrically connected to the corresponding second test pad group through the adjacent third lead group.

In the display panel of the present application, the first test pad group includes a first sub-test pad group and a second sub-test pad group; the second sub-test pad group is located between the first sub-test pad group and the second test pad group; the first lead group includes a first sub-lead group connected to the first sub-test pad group and a second sub-lead group connected to the second sub-test pad group; the second lead group includes a third sub-lead group connected to the first sub-test pad group and a fourth sub-lead group connected to the second sub-test pad group;

each of the bonding line groups is electrically connected to the corresponding second sub-test pad group through the adjacent second sub-lead group or the adjacent fourth sub-lead group; at least one of the bonding line groups is electrically connected to the corresponding first sub-test pad group through the adjacent first sub-lead group or the adjacent third sub-lead group; and the first sub-test pad group includes at least one of a power supply voltage test pad, a low-frequency clock signal test pad, a first common electrode voltage test pad, and a start trigger signal (STV) test pad; and the second sub-test pad group is configured to connect source test signals.

In the display panel of the present application, the second test pad group includes a first CK test pad group, a second common electrode voltage test pad, and a second CK test pad group which are sequentially spaced apart in the first direction; the third lead group includes a first CK line group, a common electrode voltage line, and a second CK line group which are respectively electrically connected to the first CK test pad group, the second common electrode voltage test pad, and the second CK test pad group; and every two adjacent ones of the bonding line groups are electrically connected one-to-one to the first CK line group and the second CK line group in the corresponding test pad unit.

In the display panel of the present application, the source fan-out line groups include a first side and a second side arranged opposite to each other in the first direction; the fan-out region further includes second GOA signal line groups respectively located on the first side and the second side; the bonding line groups include a first bonding line group near the first side, a second bonding line group near the second side, and a plurality of third bonding line groups positioned between the first bonding line group and the second bonding line group;

the first bonding line group is electrically connected to the second GOA signal line group located on the first side and is electrically connected to the corresponding first sub-test pad group through the adjacent first sub-lead group; the second bonding line group is electrically connected to the second GOA signal line group located on the second side and is electrically connected to the corresponding first test pad group through the adjacent third sub-lead group; the first bonding line group and the third bonding line groups are electrically connected to the corresponding second sub-test pad group through the adjacent second sub-lead group; and the second bonding line group is electrically connected to the corresponding second sub-test pad group through the adjacent fourth sub-lead group.

In the display panel of the present application, the display panel further includes a color filter plate and a liquid crystal layer, wherein the color filter plate is disposed on the counter substrate or the array substrate, and the liquid crystal layer is located between the array substrate and the counter substrate.

In the display panel of the present application, the display panel further includes multiple splicing units, wherein each of the splicing units includes the counter substrate and the array substrate.

BENEFICIAL EFFECTS

Compared to conventional techniques, the present application, by placing the CK lines between two adjacent source fan-out line groups, can increase the utilization of a wire on array (WOA) space, which is conducive to further narrowing a border width, especially a border width of a source side. Additionally, this also helps improve the temperature rise issue in the WOA region on two sides of the array substrate.

DETAILED DESCRIPTION OF EMBODIMENTS OF THE INVENTION

Figure 1:
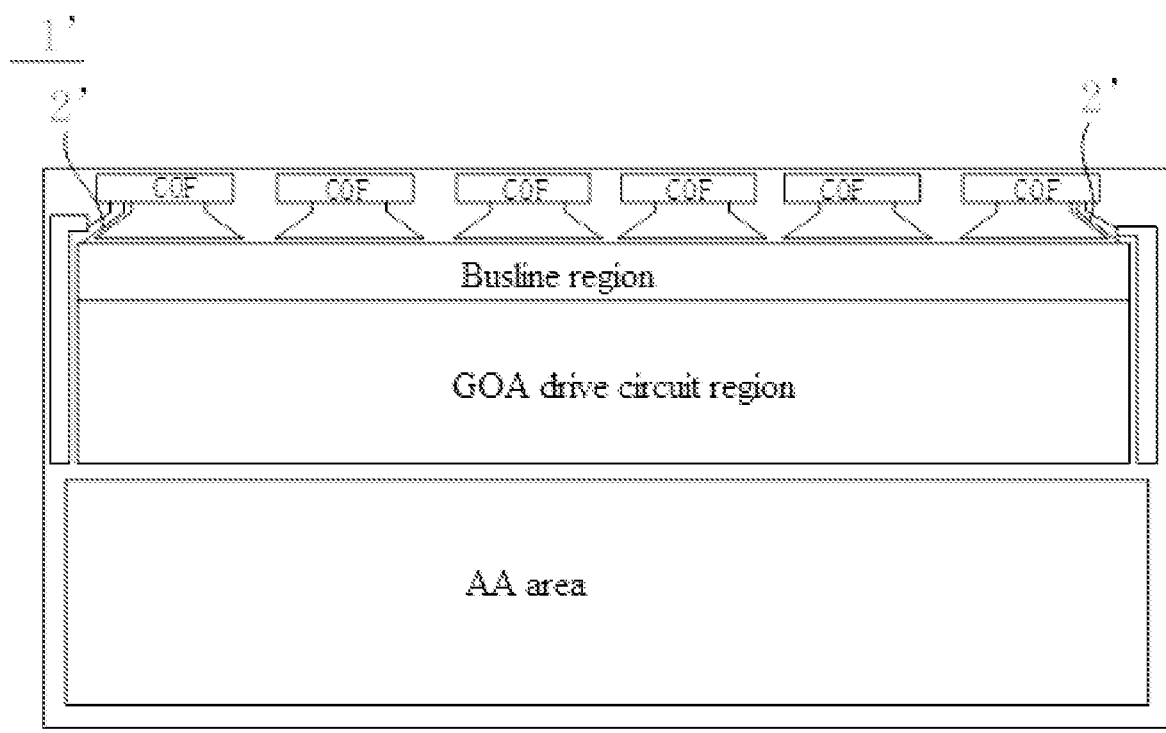
FIG. 1 is a partial structural view depicting a related-art array substrate.

A clear and comprehensive description of the technical solutions in the embodiments of this application is provided below, in conjunction with the accompanying drawings. It is evident that the described embodiments are only some of the embodiments of the present application, not the entirety. Based on the embodiments presented in this application, all other embodiments that can be obtained by those skilled in the art without creative effort fall within the scope of protection of this application.

In the description of this application, it should be understood that directional terms such as "center," "vertical," "horizontal," "length," "width," "thickness," "up," "down," "front," "back," "left," "right," "vertical," "horizontal," "top," "bottom," "inside," "outside," "clockwise," "counterclockwise," and other terms indicating directions or positional relationships are based on the orientation or positional relationships shown in the drawings for the purpose of facilitating the description of this application and simplifying the description. These directional terms do not indicate or imply that the device or elements referred to must have specific orientations, be constructed or operated in specific orientations, and therefore should not be understood as limitations on this application. Additionally, the terms "first" and "second" are used for descriptive purposes only and should not be understood as indicating relative importance or implying a specific quantity of the indicated technical features. Consequently, features designated as "first" and "second" can explicitly or implicitly include one or more of the specified features. In the description of this application, the term "multiple" means two or more unless otherwise specified.

In this application, unless otherwise explicitly specified and limited, the term "above" or "below" when referring to the first feature relative to the second feature can include the first and second features being in direct contact or can also include the first and second features not being in direct contact but in contact through another feature between them. Furthermore, the term "above," "over," and "on" when describing the first feature relative to the second feature includes the first feature being directly above and diagonally above the second feature, or it simply means that the first feature is at a higher horizontal level than the second feature. Similarly, the term "below," "under," and "beneath" when describing the first feature relative to the second feature includes the first feature being directly below and diagonally below the second feature, or it simply means that the first feature is at a lower horizontal level than the second feature.

The following disclosure provides various different embodiments or examples for implementing different structures in this application. To simplify the disclosure of this application, specific components and configurations of particular examples are described herein. Certainly, they are provided for illustration purposes and are not intended to limit the application. Furthermore, this application may refer to the same numbers and/or reference letters in different examples for the purpose of clarity and simplification, and such repetition does not indicate a relationship between the various embodiments and/or configurations being discussed. Additionally, this application provides examples of various specific processes and materials, but those skilled in the art may recognize the application of other processes and/or the use of different materials.

Figure 2:
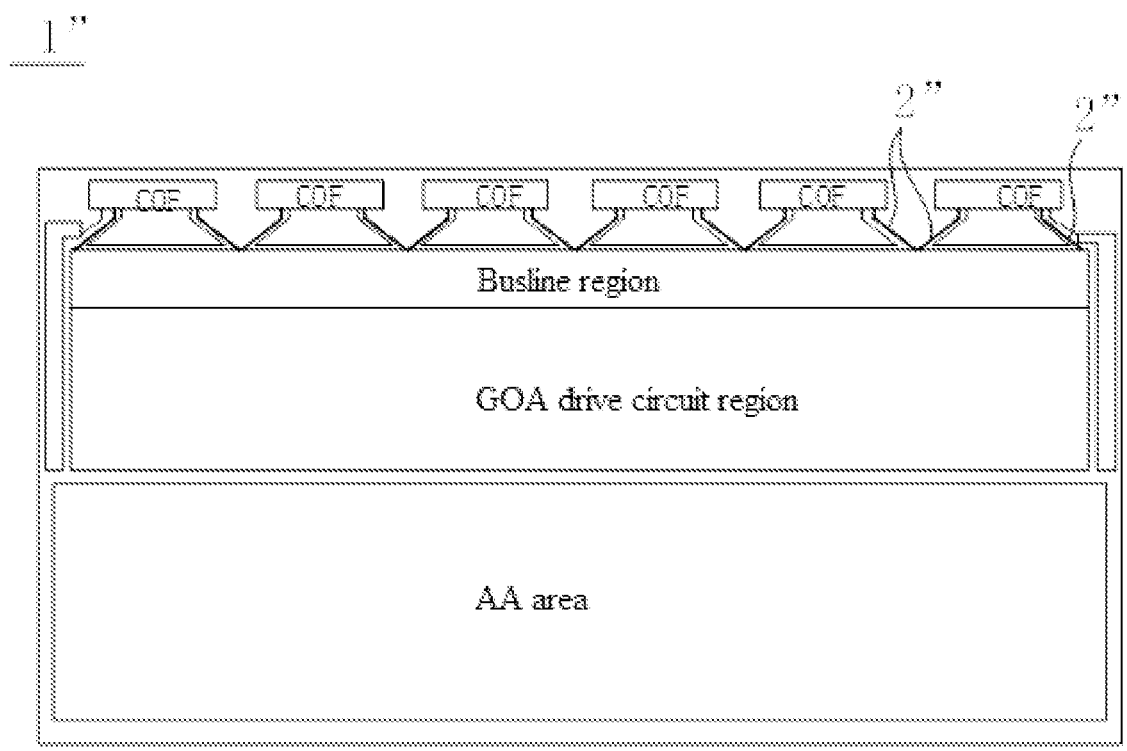
FIG. 2 is another partial structural view of the related-art array substrate.

As shown in FIG. 2, in a related-art array substrate 1", in order to mitigate the delay (RC loading) issues on the bus lines, a set of CK lines 2" is routed out from both sides of each COF to the bus lines. However, in this design, there are two sets of CK lines 2" positioned near the left and right borders, which still occupy a significant amount of space on the array substrate (WOA-wire on array), resulting in a larger width of the border on the source side and hindering the goal of reducing the border width.

To further reduce the width of the panel's border, embodiments of this application provide a new array substrate and display panel, which are detailed in the descriptions of the following embodiments.

Figure 3:
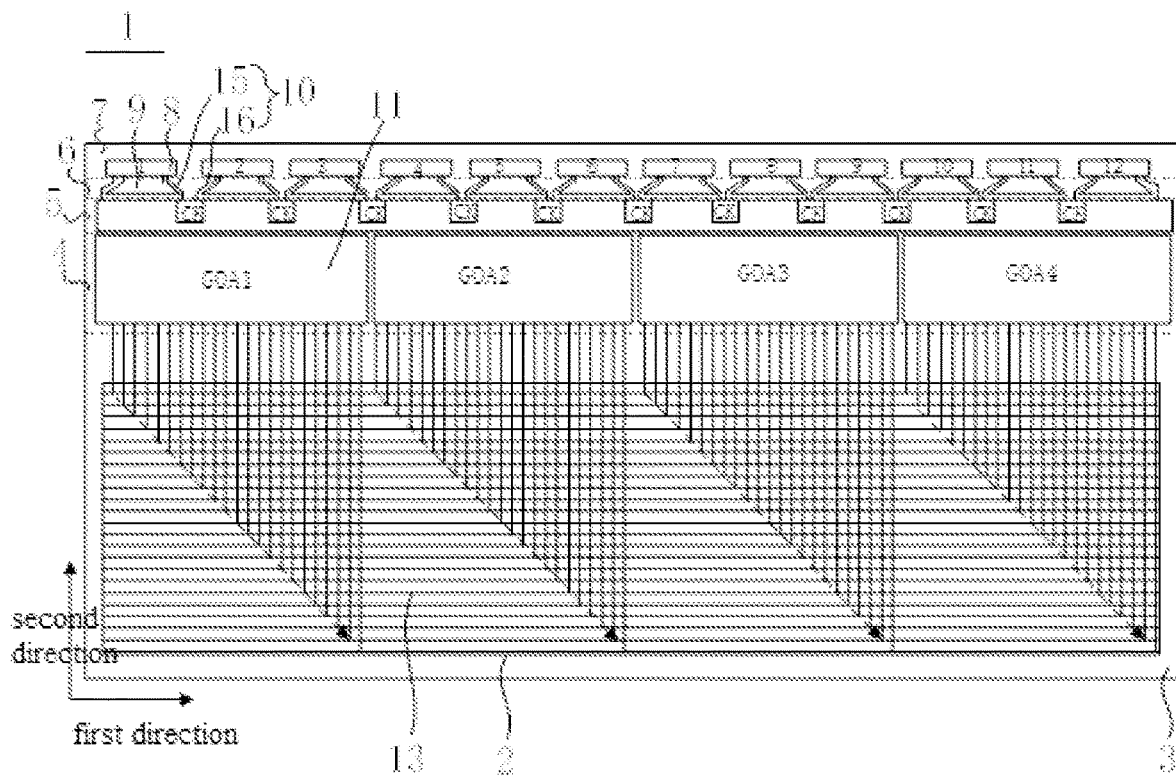
FIG. 3 is a schematic top structural view of an array substrate provided according to one embodiment of the present application.

As shown in FIGS. 3 to 10, embodiments of this application provide an array substrate 1. As depicted in FIG. 3, the array substrate 1 includes a display area 2 and a non-display area 3 located around the display area 2. The non-display area 3 consists of a GOA drive circuit region 4, a GOA busline region 5, a fan-out region 6, and a bonding region 7, all positioned on the same side of the display area 2 (for example, an upper side of the display area 2) and sequentially arranged in a direction away from the display area 2. The bonding region 7 includes multiple bonding line groups 8 spaced apart in succession along a first direction. The fan-out region 6 includes multiple source fan-out line groups 9 and at least one first GOA signal line group 10. The multiple source fan-out line groups 9 correspond one-to-one with the multiple bonding line groups 8 and are electrically connected to the multiple bonding line groups 8. The GOA drive circuit region 4 includes at least one GOA drive circuit 11, and the GOA busline region 5 includes a first GOA busline line group 12 which extends along the first direction and is electrically connected to the GOA drive circuit 11. The first GOA signal line group 10 is positioned only between adjacent source fan-out line groups 9. One end of the first GOA signal line group 10 is electrically connected to the adjacent one or two bonding line groups 8, and the other end of the first GOA signal line group 10 is electrically connected to the first GOA busline line group 12. The first GOA signal line group 10 at least includes multiple clock signal (CK) lines.

Specifically, the display area 2 includes multiple scan lines 13 extending along the first direction (e.g., a horizontal direction) and arranged parallel to each other, as well as multiple data lines (not illustrated in the drawings) extending along a second direction (e.g., a vertical direction) and arranged parallel to each other, with the first direction and the second direction being perpendicular to each other. The scan lines 13 and the data lines cross each other while being electrically insulated, forming multiple pixel areas. Each pixel area includes a pixel circuit (not shown in the drawings) used to drive the display. The data lines and the scan lines 13 provide data signals and scan signals, respectively, to the corresponding pixel circuits.

For convenience of description, the following description takes the first direction as the horizontal direction and the second direction as the vertical direction as an example.

Specifically, the number of the bonding line groups 8 includes but is not limited to 4, 6, 9, 12, 16, or 24. It can be understood that each bonding line group 8 includes multiple bonding leads, and each area where the bonding line group 8 is located is used for welding a driving chip (e.g., COF). Specifically, the driving chip is welded (electrically connected) with multiple bonding leads in the bonding line group 8.

Specifically, in this embodiment, a driving chip, such as COF, can also be welded to each bonding line group 8, and the driving chip is used to input or output electrical signals through the bonding line group 8.

Figure 5:
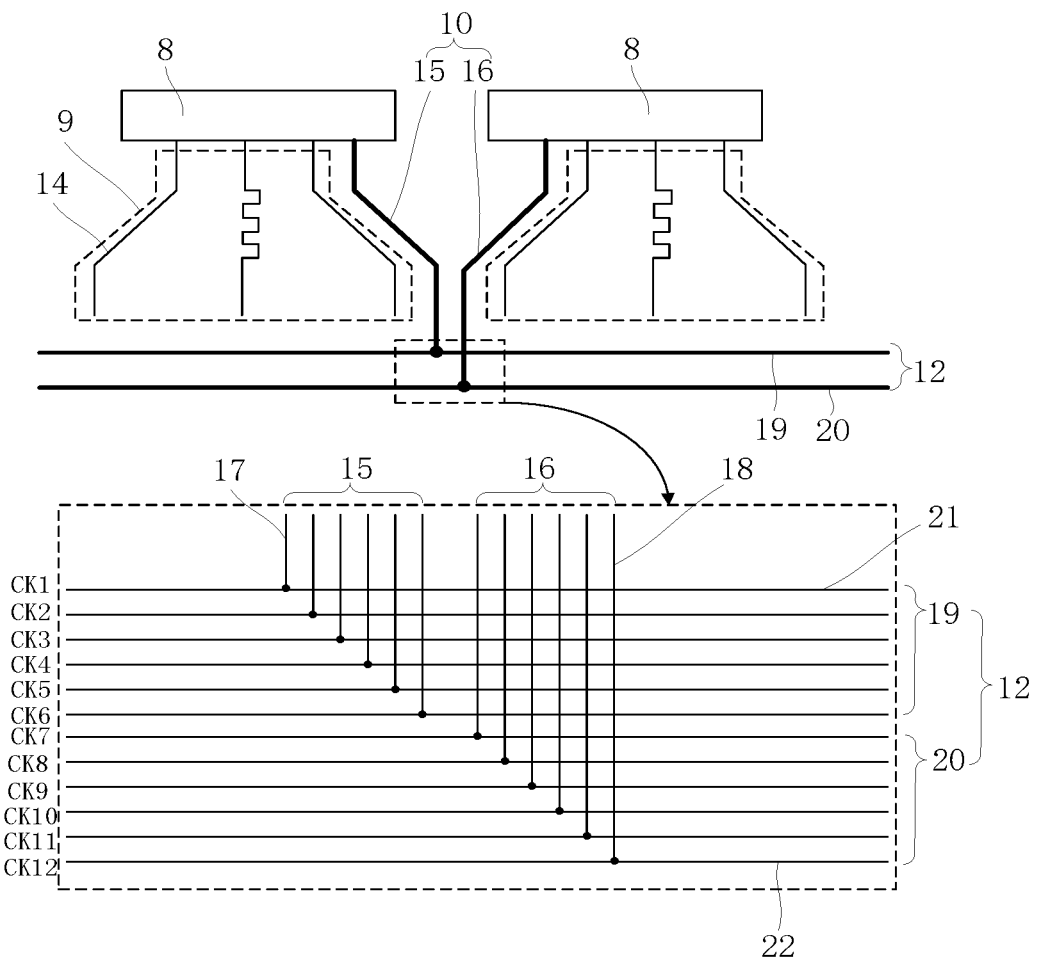
FIG. 5 is a partial enlarged view of area A in FIG. 4.

Specifically, as shown in FIG. 5, each source fan-out line group 9 includes multiple source fan-out lines 14 distributed in a fan-shaped pattern. These multiple source fan-out lines 14 extend toward the display area 2 and are electrically connected to the data lines in one-to-one correspondence for providing data signals (source signals) to the data lines. It can be understood that the data lines can be divided into multiple data line groups corresponding one-to-one with the source fan-out line groups 9. Each bonding line group 8 outputs data signals to the data lines in the corresponding data line group via the corresponding source fan-out line group 9.

Specifically, the GOA drive circuit 11 includes multiple cascaded GOA units (shift registers). For instance, each GOA drive circuit 11 includes 2160 GOA units, but not limited to this number. These multiple GOA units are electrically connected to the scan lines 13 in one-to-one correspondence for providing scan signals to the scan lines. It can be understood that the GOA drive circuits 11 can control the sequential activation of the scan lines 13 in the entire display area 2.

It should be noted that the quantity of the GOA drive circuits 11 in the GOA drive circuit region 4 in this embodiment is not limited. For example, designs like dual GOA driving, triple GOA driving, or quadruple GOA driving can be employed, but are not limited to these options.

As shown in FIG. 3, the array substrate 1 in FIG. 3 is designed for quadruple GOA driving, meaning that there are four GOA drive circuits 11 (GOA1, GOA2, GOA3, and GOA4) in the GOA drive circuit region 4. The GOA units in each GOA drive circuit 11 are electrically connected one-to-one with multiple scan lines 13 across the entire display area 2. Specifically, the four GOA drive circuits 11 are arranged sequentially along the first direction, with dashed arrows in the drawing representing the scanning direction.

Specifically, the number of the first GOA signal line groups 10 can be one or more. When there is only one first GOA signal line group 10, the first GOA signal line group 10 is positioned between any pair of adjacent source fan-out line groups 9. When there are multiple first GOA signal line groups 10, only one GOA signal line group 10 is placed between each pair of adjacent source fan-out line groups 9.

As shown in FIG. 3, this embodiment illustrates an example where one first GOA signal line group 10 is placed between any pair of adjacent source fan-out line groups 9. Specifically, the first GOA signal line group 10 is used to transmit a first GOA signal, such as a CK signal. This design allows different positions on the first GOA busline line group 12 to access the first GOA signal, effectively reducing signal delays on the first GOA busline line group 12 and enhancing display performance. Placing the first GOA signal line group 10 between adjacent source fan-out line groups 9 improves the utilization of WOA space, particularly benefiting the reduction of the width of the border on the source side.

Figure 4:
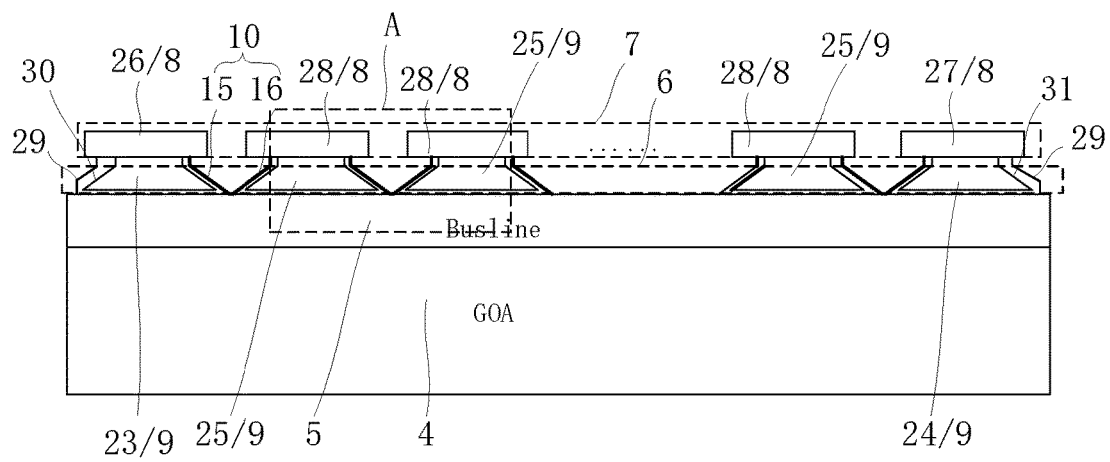
FIG. 4 shows a schematic structural view of a partial non-display area in FIG. 3.

Specifically, as shown in FIGS. 3 to 5, the first GOA signal line group 10 includes the first CK line group 15 and the second CK line group 16. The first CK line group 15 and the second CK line group 16 within the same first GOA signal line group 10 are electrically connected one-to-one with the two adjacent bonding line groups 8. Correspondingly, the first GOA busline line group 12 includes the first CK bus line group 19 and the second CK bus line group 20. Each first CK line group 15 is electrically connected to the first CK bus line group 19, and each second CK line group 16 is electrically connected to the second CK bus line group 20.

Specifically, as shown in FIG. 5, the first CK line group 15 includes multiple first CK lines 17, and the second CK line group 16 includes multiple second CK lines 18. The number of the first CK lines 17 is equal to the number of the second CK lines 18. The first CK bus line group 19 includes multiple first CK bus lines 21, and the second CK bus line group 20 includes multiple second CK bus lines 22. The multiple first CK lines 17 are electrically connected one-to-one with the multiple first CK bus lines 21, and the multiple second CK lines 18 are electrically connected one-to-one with the multiple second CK bus lines 22.

It should be noted that each first GOA signal line group 10 includes 2N CK lines, where N is a positive integer. The first CK line group 15 includes N first CK lines 17, and the second CK line group 16 includes N second CK lines 18. In this embodiment of the application, an example is provided for illustration where each first GOA signal line group 10 includes 12 CK lines, and the number of the first CK lines 17 and the number of the second CK lines 18 are both 6. Correspondingly, the number of the first CK bus lines 21 and the number of the second CK bus lines 22 are also both 6. As shown in FIG. 5, the first CK bus line group 19 includes bus lines CK1 to CK6, and the second CK bus line group 20 includes bus lines CK7 to CK12.

Specifically, as shown in FIG. 4, the multiple source fan-out line groups 9 include a first source fan-out line group 23 and a second source fan-out line group 24 which are arranged oppositely in the first direction and located near left and right edges of the array substrate 1. Additionally, the multiple source fan-out line groups 9 include multiple third source fan-out line groups 25 positioned between the first source fan-out line group 23 and the second source fan-out line group 24. It can be understood that the first source fan-out line group 23 is the leftmost source fan-out line group 9, and the second source fan-out line group 24 is the rightmost source fan-out line group 9.

The first CK line group 15 is located on one side of the first source fan-out line group 23 adjacent to the third source fan-out line group 25, and the second CK line group 16 is located on one side of the second source fan-out line group 24 adjacent to the third source fan-out line group 25. Additionally, one side of each third source fan-out line group 25 near the first source fan-out line group 23 is provided with the second CK line group 16, and one side of each third source fan-out line group 25 near the second source fan-out line group 24 is provided with the first CK line group 15.

Specifically, as shown in FIG. 4, the bonding line groups 8 include a first bonding line group 26 and a second bonding line group 27 which are arranged opposite to each other along the first direction and located near the left and right edges of the array substrate 1. Additionally, the bonding line groups 8 include multiple third bonding line groups 28 positioned between the first bonding line group 26 and the second bonding line group 27. It can be understood that the first bonding line group 26 and the second bonding line group 27 are respectively the leftmost and rightmost bonding line groups 8.

Specifically, each bonding line group 8 includes source signal terminal groups (not shown in the drawings) connected to the corresponding source fan-out line groups 9. The first bonding line group 26 also includes a first CK signal terminal group (not shown in the drawings) located on one side of the source signal terminal group near the third bonding line group 28. The second bonding line group 27 also includes a second CK signal terminal group (not shown in the drawing) located on one side of the source signal terminal group near the third bonding line group 28. The third bonding line group 28 further includes a second CK signal terminal group located on one side of the source signal terminal group near the first bonding line group 26 and includes a first CK signal terminal group located on one side of the source signal terminal group near the second bonding line group 27. Each first CK signal terminal group is electrically connected to the corresponding first CK line group 15, and each second CK signal terminal group is electrically connected to the corresponding second CK line group 16.

In one specific embodiment, as shown in FIG. 3, there are 12 source fan-out line groups 9, 12 bonding line groups 8, and 11 first GOA signal line groups 10. From left to right, a right side of the first source fan-out line group 9 is provided with the first CK line group 15, and each of the 2nd to 11th source fan-out line groups 9 is provided with the second CK line group 16 and the first CK line group 15 on left and right sides. A left side of the 12th source fan-out line group 9 is provided with the second CK line group 16. Correspondingly, from left to right, the first CK signal terminal group of the first bonding line group 8 is electrically connected to the corresponding first CK line group 15. In the 2nd to 11th bonding line groups 8, the first CK signal terminal group of each bonding line group 8 is electrically connected to the corresponding first CK line group 15, and each second CK signal terminal group of each bonding line group 8 is electrically connected to the corresponding second CK line group 16. In the 12th bonding line group 8, the second CK signal terminal group is electrically connected to the corresponding second CK line group 16.

It can be understood that the first CK signal terminal group includes 6 CK signal terminals, and the second CK signal terminal group includes 6 CK signal terminals. Each CK signal terminal is connected to one CK line.

Specifically, as shown in FIG. 4, the fan-out region 6 further includes at least one second GOA signal line group 29. The multiple source fan-out line groups 9 include a first side 30 and a second side 31 arranged opposite to each other in the first direction. The second GOA signal line group 29 is positioned on either the first side 30 or the second side 31. Correspondingly, the GOA busline line groups further include a second GOA busline line group 32 that extends along the first direction and is electrically connected to the GOA drive circuit 11. One end of the second GOA signal line group 29 is electrically connected to the adjacent bonding line group 8, and the other end of the second GOA signal line group 29 is electrically connected to the second GOA busline line group 32.

In a specific embodiment, there are 2 second GOA signal line groups 29. The 2 second GOA signal line groups 29 are located on the first side 30 and the second side 31, respectively. The first bonding line group 26 near the first side 30 further includes a GOA signal terminal group (not shown in the drawing) located on one side of the source signal terminal group away from the third bonding line group 28, wherein the GOA signal terminal group is electrically connected to the corresponding second GOA signal line group 29. The second bonding line group 27 near the second side 31 also includes a GOA signal terminal group located on one side of the source signal terminal group away from the third bonding line group 28, wherein the third bonding line group 28 is electrically connected to the corresponding second GOA signal line group 29.

It can be understood that the first side 30 corresponds to the side of the first source fan-out line group 23 away from the third source fan-out line group 25, and the second side 31 corresponds to the side of the second source fan-out line group 24 away from the third source fan-out line group 25.

Specifically, each second GOA signal line group 29 includes multiple GOA signal lines used for transmitting a second GOA signal. In one specific embodiment, the second GOA signal line group 29 includes at least a low voltage (VSS) line, a start trigger signal (STV, start of vertical) line, a reset signal line, and a low-frequency clock signal (LC) line, but not limited to these. In other words, the second GOA signal can be any GOA signal other than the CK signal.

It can be understood that the array substrate 1 provided in the present embodiment is a design without CK lines on two sides.

For an array substrate with 12 CK lines, when using the design method shown in FIG. 2 and placing the CK lines on two sides of each COF (equivalent to the bonding line group in this application) with a GOA line width/line spacing (unit: um) L/S of 30/30, a required WOA width for one set of CK lines is approximately 720 μm, and a required WOA width for other signal line is about 600 μm. Therefore, the width requirement for a source side in a WOA region is about 1320 um. However, by adopting the design method shown in FIG. 3, which groups the CK lines between each pair of adjacent bonding line groups (specifically between adjacent source fan-out line groups), up to 720 μm of space can be saved, which is advantageous for reducing a border width of the source side. Moreover, it is verified that the design method shown in FIG. 3 has a very minimal impact on bus delay issues and improves the temperature rise issue in the WOA region on two sides of the panel.

For an array substrate with 8 CK lines, if using the design method shown in FIG. 2 and placing the CK lines on two sides of each COF with a GOA line width/line spacing (unit: um) L/S is 40/40, a required WOA width for one set of CK lines is approximately 640 μm, and a required WOA width for other signal line is approximately 750 μm. Therefore, the width requirement for the source side in the WOA region is about 1320 um. However, by using the design method shown in FIG. 3, where the CK lines are grouped between each adjacent pair of the bonding line groups (specifically placed between adjacent source fan-out line groups), up to 640 μm of space can be saved. This is beneficial for narrowing the border width of the source side. Moreover, it is verified that the design method shown in FIG. 3 has a very minimal impact on the bus delay issues and improves the temperature rise issue in the WOA region on two sides of the panel.

Therefore, in this embodiment, by placing the CK lines between two adjacent source fan-out line groups 9, it can increase the utilization of the WOA space, which is conducive to further narrowing the border width, especially the border width of the source side. Additionally, it also helps improve the temperature rise issue in the WOA region on two sides of the array substrate.

Figure 6:
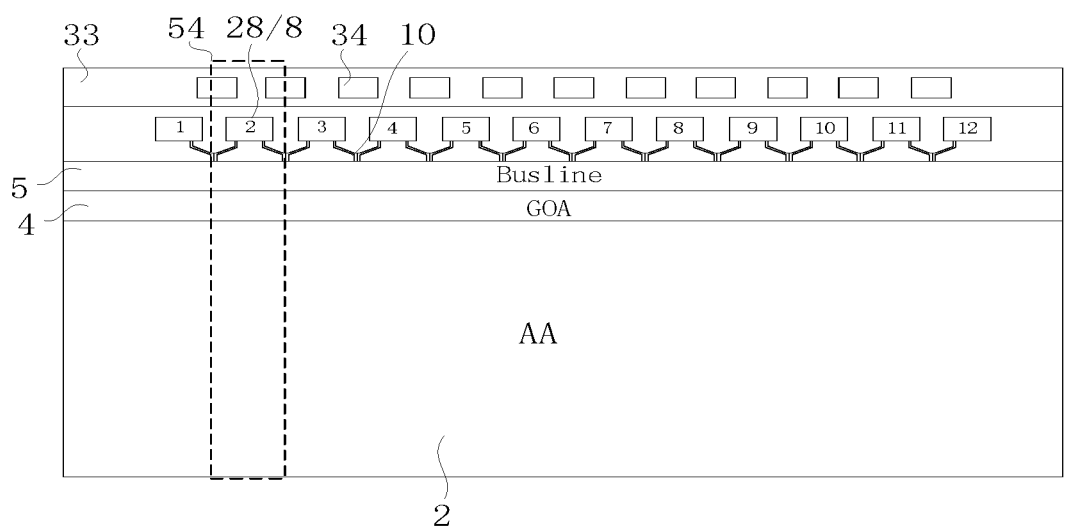
FIG. 6 is a top structural view of the array substrate according to one embodiment of the present application before a cutting region is cut.
Figure 7:
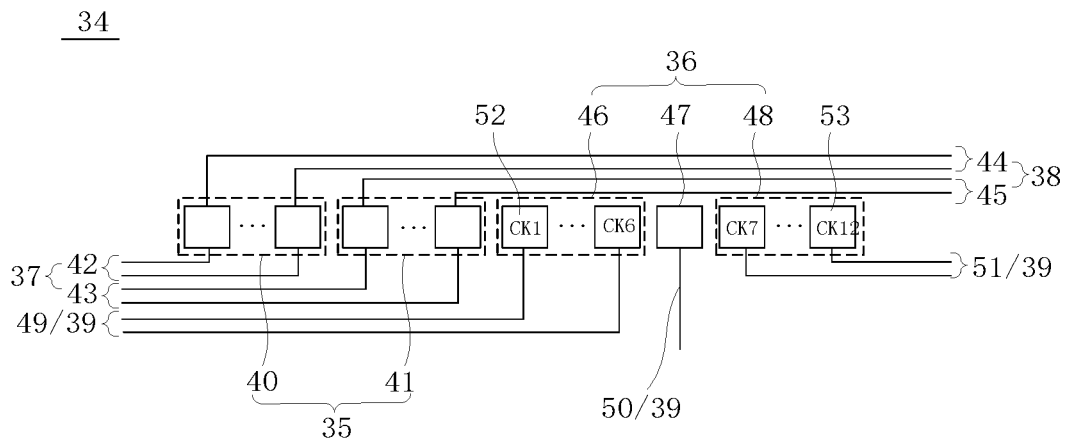
FIG. 7 is a schematic structural diagram illustrating test pad units according to one embodiment of the present application.

Specifically, as shown in FIGS. 6 and 7, the array substrate 1 further includes a cutting region 33 located on one side of the bonding region 7 away from the display area 2. The cutting region 33 includes multiple test pad units 34 that are structurally identical and are successively spaced along the first direction. Each pair of the adjacent bonding line groups 8 is arranged corresponding to and is electrically connected to one test pad unit 34.

It can be understood that the test pad units 34 are used to test the GOA signals and the source signals on the array substrate 1. When the testing is complete, the cutting region 33 on the array substrate 1 is then cut off to further narrow the border, as the goal.

Specifically, as shown in FIG. 7, the test pad units 34 include a first test pad group 35 and a second test pad group 36 spaced along the first direction, a first lead group 37 and a second lead group 38 electrically connected to the first test pad group 35, and a third lead group 39 electrically connected to the second test pad group 36. The first lead group 37 extends from one side of the first test pad group 35 near the bonding region 7, the second lead group 38 extends from one side of the first test pad group 35 away from the bonding region 7, and the third lead group 39 extends from one side of the second test pad group 36 near the bonding region 7. At least one bonding line group 8 is electrically connected to the corresponding first test pad group 35 through the adjacent first lead group 37, at least one bonding line group 8 is electrically connected to the corresponding first test pad group 35 through the adjacent second lead group 38, and at least one bonding line group 8 is electrically connected to the corresponding second test pad group 36 through the adjacent third lead group 39.

It can be understood that each pad in the first test pad group 35 has leads on both its upper and lower sides, and the bonding line groups can choose to connect through the upper or lower side leads based on the actual situation, making the wire layout more reasonable.

Specifically, as shown in FIG. 7, the first test pad group 35 includes a first sub-test pad group 40 and a second sub-test pad group 41. The second sub-test pad group 41 is located between the first sub-test pad group 40 and the second test pad group 36. The first lead group 37 includes a first sub-lead group 42 connected to the first sub-test pad group 40 and a second sub-lead group 43 connected to the second sub-test pad group 41. The second lead group 38 includes a third sub-lead group 44 connected to the first sub-test pad group 40 and a fourth sub-lead group 45 connected to the second sub-test pad group 41.

Specifically, the first sub-test pad group 40 includes at least one of a power supply voltage test pad, a low-frequency clock signal test pad, a first common electrode voltage test pad, and a start trigger signal (STV) test pad. For example, the first sub-test pad group 40 includes at least one of the following: an operation voltage (VGH) test pad, a stable voltage (VSSG/VSSQ) test pad, a low-frequency clock signal (LC) test pad, a first common electrode voltage (A_COM) test pad, a shield voltage (GBS/DBS) test pad, and a start trigger signal (STV, start of vertical) test pad, but not limited to these.

Specifically, the second sub-test pad group 41 includes at least one source signal test pad, such as a red data (Data_R) test pad, a green data (Data_G) test pad, and a blue data (Data_B) test pad.

It can be understood that the first sub-test pad group 40 is electrically connected to the second GOA signal line group 29 for testing the second GOA signal, and the second sub-test pad group 41 is electrically connected to the source fan-out line group 9 for testing source fan-out signals.

Specifically, the number of test pads in the first sub-test pad group 40 can be equal to the number of lines in the second GOA signal line group 29; however, the present application is not limited to in this regard, and the configuration may vary as long as the first sub-test pad group 40 can test all of the second GOA signals.

Specifically, as each source fan-out line group 9 is arranged corresponding to one bonding line group 8. Each bonding line group 8 is electrically connected to the second sub-test pad group 41 through the adjacent second sub-lead group 43 or fourth sub-lead group 45 to facilitate testing of the source fan-out signals.

In particular, at least one bonding line group 8 (e.g., the first bonding line group 26 and the second bonding line group 27) is electrically connected to the first sub-test pad group 40 through the adjacent first sub-lead group 42 or third sub-lead group 44 to facilitate testing of the second GOA signals. It can be understood that the bonding line group 8 electrically connected to the first sub-test pad group also serves to connect with the second GOA signal line group 29.

As shown in FIG. 7, the second test pad group 36 includes a first CK test pad group 46, a second common electrode voltage (e.g., CF_COM) test pad 47, and a second CK test pad group 48 which are sequentially spaced apart in the first direction. The third lead group 39 includes a first CK line group 49, a common electrode voltage line 50, and a second CK line group 51, which are electrically connected to the first CK test pad group 46, the second common electrode voltage test pad 47, and the second CK test pad group 48 respectively. Every two adjacent ones of the bonding line groups 8 are electrically connected one-to-one with the first CK line group 49 and the second CK line group 51 in the corresponding test pad unit 34.

In particular, the first CK test pad group 46 includes multiple first CK test pads 52 spaced apart sequentially in the first direction, and the second CK test pad group 48 includes multiple second CK test pads 53 spaced apart sequentially in the first direction. The quantity of the first CK test pads 52 is equal to the quantity of the second CK test pads 53, such as all being 6. It can be understood that the first CK test pads 52 are electrically connected one-to-one with the first CK lines 17 in the first CK line group 15, and the second CK test pads 53 are electrically connected one-to-one with the second CK lines 18 in the second CK line group 16.

Figure 8:
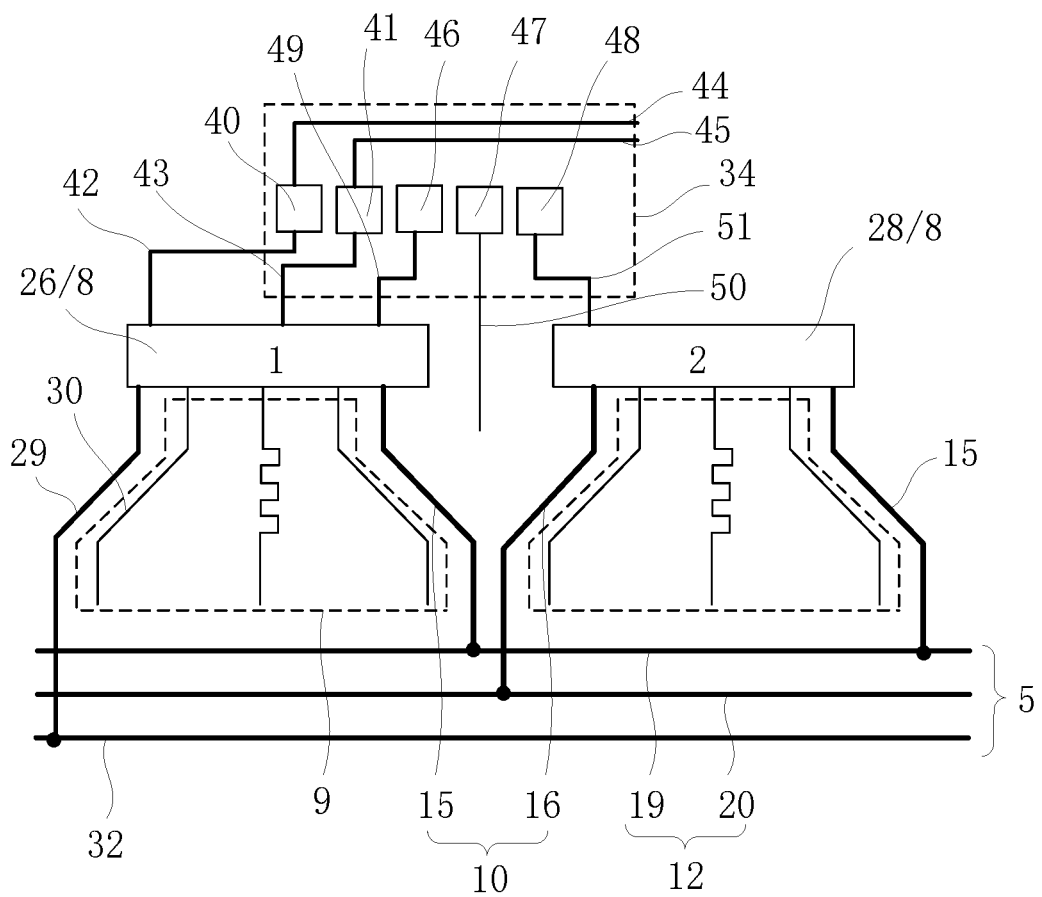
FIG. 8 is a schematic diagram showing the connection of a first bonding line group and an adjacent third bonding line group to the test pad units in accordance with one embodiment of the present application.
Figure 9:
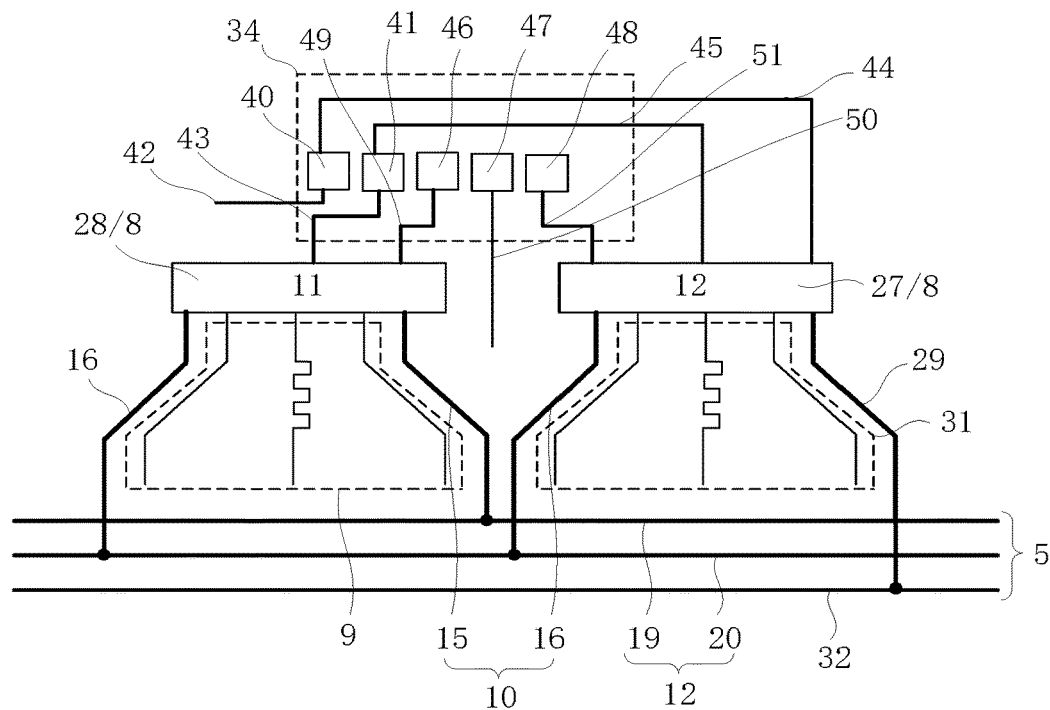
FIG. 9 is a schematic diagram illustrating the connection of a second bonding line group and the adjacent third bonding line group to the test pad units according to one embodiment of the present application.
Figure 10:
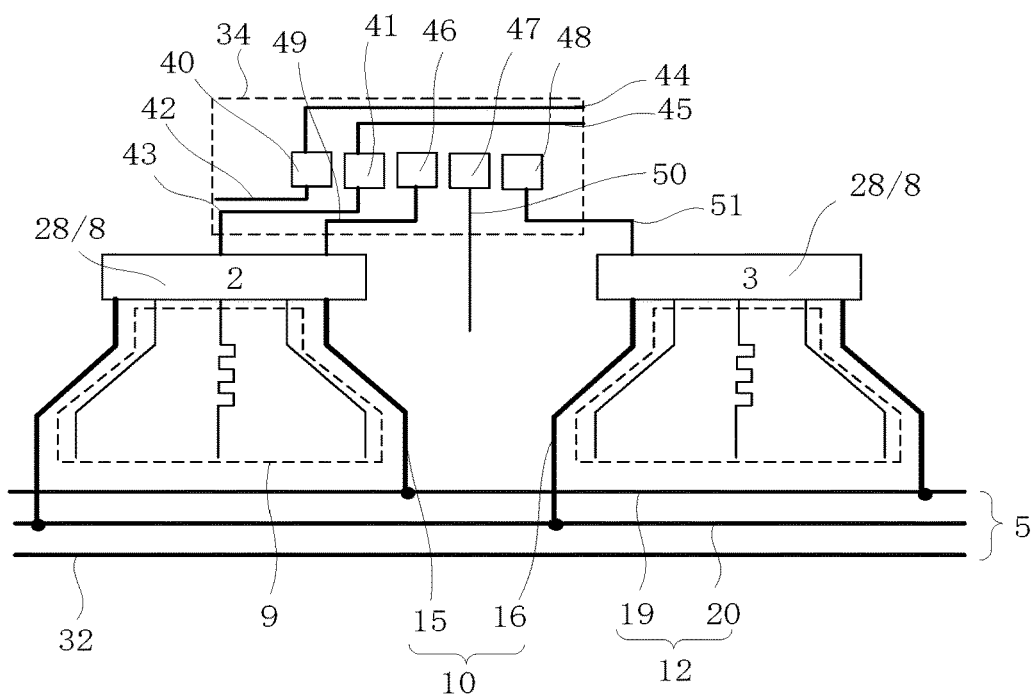
FIG. 10 is a schematic diagram illustrating the connection of two adjacent third bonding line groups to the test pad units according to one embodiment of the present application.

In a specific embodiment, the bonding line groups 8 include the first bonding line group 26 and the second bonding line group 27 arranged opposite to each other in the first direction and located near the left and right edges of the array substrate 1, as well as multiple third bonding line groups 28 located between the first bonding line group 26 and the second bonding line group 27. As illustrated in FIGS. 8 to 10, the first bonding line group 26 is electrically connected to the corresponding first sub-test pad group 40 through the adjacent first sub-lead group 42. The second bonding line group 27 is electrically connected to the corresponding first sub-test pad group 40 through the adjacent third sub-lead group 44. The first bonding line group 26 and the third bonding line groups 28 are all electrically connected to the corresponding second sub-test pad group 41 through the adjacent second sub-lead group 43. The second bonding line group 27 is electrically connected to the corresponding second sub-test pad group 41 through the adjacent fourth sub-lead group 45. This design reduces wire crossovers and results in a more rational wiring layout.

It should be noted that in the embodiments described in this application, any two test pad units 34 have an identical structure. Since only the first bonding line group 26 and/or the second bonding line group 27 is electrically connected to the corresponding second GOA signal line group 29 for outputting the second GOA signal, only the first bonding line group 26 and/or the second bonding line group 27 is electrically connected to the corresponding first sub-test pad group 40 through the adjacent first sub-lead group 42 or the adjacent third sub-lead group 44. It can be understood that the first sub-lead group 42 or the third sub-lead group 44 not connected to the bonding line group 8 is in a floating state. Similarly, the second sub-test pad group 41, used to test the source signals, has the second sub-lead group 43 and the fourth sub-lead group 45 arranged on two sides of the second sub-test pad group 41. Each bonding line group 8 is electrically connected to the corresponding second sub-test pad group 41 through the adjacent second sub-lead group 43 or the fourth sub-lead group 45, ensuring that the second sub-lead group 43 or the fourth sub-lead group 45 not connected to the bonding line groups 8 is in the floating state.

Each test pad unit 34 has an identical structure, each first GOA signal line group 10 has an identical structure, each third bonding line group 28 has an identical structure, and each third source fan-out line group 25 has an identical structure. Therefore, when the test pads are provided for each bonding line group 8, the test pad units 34 provided in this embodiment can also be used for mask splicing technology, making the test pad units 34 suitable for large-sized splicing designs.

Specifically, during a manufacturing process of the array substrate 1, mask splicing technology can be used to create areas controlled by each third bonding line group 28. For example, an area controlled by one third bonding line group 28 can be defined as a repeating area, and the area controlled by different third bonding line groups 28 can be produced using the same mask splicing process, forming multiple test pad units 34 with the same structure.

For instance, as shown in FIG. 6, there are 12 bonding line groups 8, 11 first GOA signal line groups 10, and 11 test pad units 34. Each first GOA signal line group 10 is arranged corresponding to one test pad unit 34, and each test pad unit 34 is arranged corresponding to two adjacent bonding line groups 8. The areas controlled by the second through eleventh bonding line groups 8 can be evenly divided into ten repeating areas 54, with each repeating area 54 corresponding to one bonding line group 8. The structures within each repeating area 54 can be produced using the same mask, meaning that the areas controlled by the second through eleventh bonding line groups 8 are created through mask splicing, resulting in multiple test pad units 34 with identical structures.

Therefore, the array substrate 1 provided in this embodiment not only narrows the border width of the source side but also is suitable for mask splicing technology, which is advantageous for producing large-sized source side driving row display panel products.

This embodiment also provides the test pad unit 34 as described in the previous embodiment; please refer to the description in the previous embodiment for details.

Figure 11:
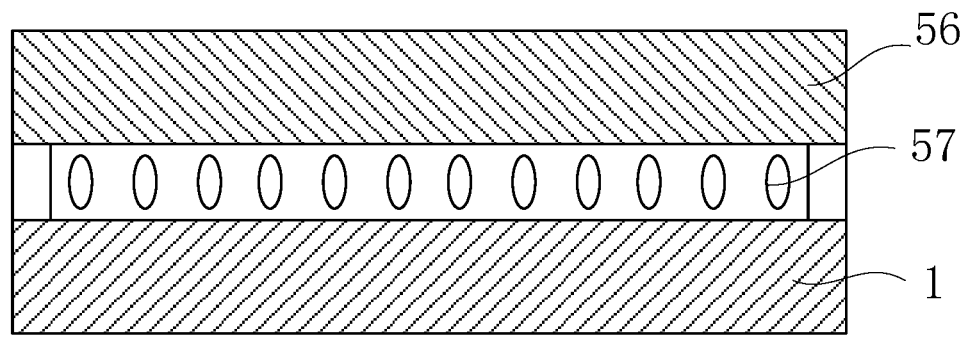
FIG. 11 is a schematic cross-sectional view illustrating a display panel provided in one embodiment of the present application.

As shown in FIG. 11, this embodiment also provides a display panel 55. The display panel 55 comprises a counter substrate 56 and the array substrate 1 as described in the previous embodiment. The counter substrate 56 is arranged opposite to the array substrate 1.

Specifically, the display panel 55 is a liquid crystal display panel and includes a color filter layer and a liquid crystal layer 57. The color filter layer is located on either the counter substrate 56 or the array substrate 1, and the liquid crystal layer 57 is positioned between the array substrate 1 and the counter substrate 56.

In particular, the display panel 55 can be a splicing panel, comprising multiple splicing units, with each splicing unit consisting of the counter substrate 56 and the array substrate 1 as described in the previous embodiment.

In addition to the advantages of the previous embodiment, this embodiment is also conducive to obtaining the large-sized splicing display panel 55 with narrow bezels/borders.

In the above embodiments, the descriptions of each embodiment have their respective emphases. For parts not detailed in a specific embodiment, you can refer to the relevant descriptions in other embodiments.

The above detailed descriptions have provided an array substrate and a display panel in accordance with embodiments of this application. Specific examples have been used to elucidate the principles and implementation methods of this application. The explanations in the above embodiments are intended to assist in understanding the technical solutions and the core ideas of this application. Those skilled in the art should understand that they can still modify the technical solutions described in the various embodiments mentioned above or make equivalent replacements for some technical features. However, such modifications or replacements do not take the essence of the corresponding technical solutions out of the scope of the technical solutions in the embodiments of this application.

What is claimed is:

1. An array substrate, comprising a display area and a non-display area surrounding the display area, wherein the non-display area consists of a gate-driver-on-array (GOA) drive circuit region, a GOA busline region, a fan-out region, and a bonding region, all positioned on a same side of the display area and sequentially arranged in a direction away from the display area; the bonding region comprises multiple bonding line groups spaced apart in succession along a first direction; the fan-out region comprises multiple source fan-out line groups and at least one first GOA signal line group; the source fan-out line groups are arranged in a one-to-one correspondence with the bonding line groups and are electrically connected to the bonding line groups; the GOA drive circuit region comprises at least one GOA drive circuit; and the GOA busline region comprises a first GOA busline line group which extends along the first direction and is electrically connected to the at least one GOA drive circuit;

wherein the array substrate further comprises a cutting region located on one side of the bonding region away from the display area, and the cutting region comprises multiple test pad units which are structurally identical and are successively spaced along the first direction;

each adjacent pair of the bonding line groups is arranged corresponding to and is electrically connected to one test pad unit;

wherein the test pad units comprise a first test pad group and a second test pad group which are spaced and arranged along the first direction, a first lead group and a second lead group which are electrically connected to the first test pad group, and a third lead group electrically connected to the second test pad group; the first lead group extends from one side of the first test pad group near the bonding region; the second lead group extends from one side of the first test pad group away from the bonding region; and the third lead group extends from one side of the second test pad group near the bonding region; wherein at least one of the bonding line groups is electrically connected to the corresponding first test pad group through the adjacent first lead group; at least one of the bonding line groups is electrically connected to the corresponding first test pad group through the adjacent second lead group; and at least one of the bonding line groups is electrically connected to the corresponding second test pad group through the adjacent third lead group;

wherein each of the at least one first GOA signal line group is positioned only between adjacent source fan-out line groups, where one end of the first GOA signal line group is electrically connected to adjacent one or two of the bonding line groups, the other end of the first GOA signal line group is electrically connected to the first GOA busline line group, and the first GOA signal line group at least comprises multiple clock signal (CK) lines;

wherein each of the at least one first GOA signal line group comprises a first CK line group and a second CK line group; in the same first GOA signal line group, the first CK line group and the second CK line group are electrically connected in a one-to-one correspondence to two adjacent ones of the bonding line groups; the first GOA busline line group comprises a first CK bus line group and a second CK bus line group; each first CK line group is electrically connected to the first CK bus line group; and each second CK line group is electrically connected to the second CK bus line group.

2. The array substrate according to claim 1, wherein one of the first GOA signal line groups is arranged between any adjacent pair of the source fan-out line groups.

3. The array substrate according to claim 1, wherein the first CK line group comprises multiple first CK lines, the second CK line group comprises multiple second CK lines, and a number of the first CK lines is equal to a number of the second CK lines; and the first CK bus line group comprises multiple first CK bus lines, the second CK bus line group comprises multiple second CK bus lines, the first CK lines are electrically connected in a one-to-one correspondence to the first CK bus lines, and the second CK lines are electrically connected in a one-to-one correspondence to the second CK bus lines.

4. The array substrate according to claim 1, wherein the fan-out region further comprises at least one second GOA signal line group; the source fan-out line groups comprise a first side and a second side arranged opposite to each other in the first direction; the second GOA signal line group is disposed on either the first side or the second side; the GOA busline line groups further comprise a second GOA busline line group which extends along the first direction and is electrically connected to the corresponding GOA drive circuit; one end of the second GOA signal line group is electrically connected to the adjacent bonding line group, and another end of the second GOA signal line group is electrically connected to the second GOA busline line group; and the second GOA signal line group comprises at least a low voltage (VSS) line, a start trigger signal (STV) line, a reset signal line, and a low-frequency clock signal (LC) line.

5. The array substrate according to claim 1, wherein the first test pad group comprises a first sub-test pad group and a second sub-test pad group; the second sub-test pad group is located between the first sub-test pad group and the second test pad group; the first lead group comprises a first sub-lead group connected to the first sub-test pad group and a second sub-lead group connected to the second sub-test pad group; the second lead group comprises a third sub-lead group connected to the first sub-test pad group and a fourth sub-lead group connected to the second sub-test pad group;

each of the bonding line groups is electrically connected to the corresponding second sub-test pad group through the adjacent second sub-lead group or the adjacent fourth sub-lead group; at least one of the bonding line groups is electrically connected to the corresponding first sub-test pad group through the adjacent first sub-lead group or the adjacent third sub-lead group; and the first sub-test pad group comprises at least one of a power supply voltage test pad, a low-frequency clock signal test pad, a first common electrode voltage test pad, and a start trigger signal (STV) test pad; and the second sub-test pad group is configured to connect source test signals.

6. The array substrate according to claim 5, wherein the second test pad group comprises a first CK test pad group, a second common electrode voltage test pad, and a second CK test pad group which are sequentially spaced apart in the first direction; the third lead group comprises a first CK line group, a common electrode voltage line, and a second CK line group which are respectively electrically connected to the first CK test pad group, the second common electrode voltage test pad, and the second CK test pad group; and every two adjacent ones of the bonding line groups are electrically connected one-to-one to the first CK line group and the second CK line group in the corresponding test pad unit.

7. The array substrate according to claim 6, wherein the source fan-out line groups comprise a first side and a second side arranged opposite to each other in the first direction; the fan-out region further comprises second GOA signal line groups respectively located on the first side and the second side; the bonding line groups comprise a first bonding line group near the first side, a second bonding line group near the second side, and a plurality of third bonding line groups positioned between the first bonding line group and the second bonding line group;

the first bonding line group is electrically connected to the second GOA signal line group located on the first side and is electrically connected to the corresponding first sub-test pad group through the adjacent first sub-lead group; the second bonding line group is electrically connected to the second GOA signal line group located on the second side and is electrically connected to the corresponding first test pad group through the adjacent third sub-lead group; the first bonding line group and the third bonding line groups are electrically connected to the corresponding second sub-test pad group through the adjacent second sub-lead group; and the second bonding line group is electrically connected to the corresponding second sub-test pad group through the adjacent fourth sub-lead group.

8. A display panel, comprising a counter substrate and an array substrate, wherein the counter substrate is arranged opposite to the array substrate, and the array substrate comprises a display area and a non-display area surrounding the display area, wherein the non-display area consists of a gate-driver-on-array (GOA) drive circuit region, a GOA busline region, a fan-out region, and a bonding region, all positioned on a same side of the display area and sequentially arranged in a direction away from the display area; the bonding region comprises multiple bonding line groups spaced apart in succession along a first direction; the fan-out region comprises multiple source fan-out line groups and at least one first GOA signal line group; the source fan-out line groups are arranged in a one-to-one correspondence with the bonding line groups and are electrically connected to the bonding line groups; the GOA drive circuit region comprises at least one GOA drive circuit; and the GOA busline region comprises a first GOA busline line group which extends along the first direction and is electrically connected to the at least one GOA drive circuit;

wherein the array substrate further comprises a cutting region located on one side of the bonding region away from the display area, and the cutting region comprises multiple test pad units which are structurally identical and are successively spaced along the first direction; each adjacent pair of the bonding line groups is arranged corresponding to and is electrically connected to one test pad unit;

wherein the test pad units comprise a first test pad group and a second test pad group which are spaced and arranged along the first direction, a first lead group and a second lead group which are electrically connected to the first test pad group, and a third lead group electrically connected to the second test pad group; the first lead group extends from one side of the first test pad group near the bonding region; the second lead group extends from one side of the first test pad group away from the bonding region; and the third lead group extends from one side of the second test pad group near the bonding region; wherein at least one of the bonding line groups is electrically connected to the corresponding first test pad group through the adjacent first lead group, at least one of the bonding line groups is electrically connected to the corresponding first test pad group through the adjacent second lead group; and at least one of the bonding line groups is electrically connected to the corresponding second test pad group through the adjacent third lead group;

wherein each of the at least one first GOA signal line group is positioned only between adjacent source fan-out line groups, where one end of the first GOA signal line group is electrically connected to adjacent one or two of the bonding line groups, the other end of the first GOA signal line group is electrically connected to the first GOA busline line group, and the first GOA signal line group at least comprises multiple clock signal (CK) lines;

wherein each of the at least one first GOA signal line group comprises a first CK line group and a second CK line group; in the same first GOA signal line group, the first CK line group and the second CK line group are electrically connected in a one-to-one correspondence to two adjacent ones of the bonding line groups; the first GOA busline line group comprises a first CK bus line group and a second CK bus line group; each first CK line group is electrically connected to the first CK bus line group; and each second CK line group is electrically connected to the second CK bus line group.

9. The display panel according to claim 8, wherein one of the first GOA signal line groups is arranged between any adjacent pair of the source fan-out line groups.

10. The display panel according to claim 8, wherein the first CK line group comprises multiple first CK lines, the second CK line group comprises multiple second CK lines, and a number of the first CK lines is equal to a number of the second CK lines; and the first CK bus line group comprises multiple first CK bus lines, the second CK bus line group comprises multiple second CK bus lines, the first CK lines are electrically connected in a one-to-one correspondence to the first CK bus lines, and the second CK lines are electrically connected in a one-to-one correspondence to the second CK bus lines.

11. The display panel according to claim 8, wherein the fan-out region further comprises at least one second GOA signal line group; the source fan-out line groups comprise a first side and a second side arranged opposite to each other in the first direction; the second GOA signal line group is disposed on either the first side or the second side; the GOA busline line groups further comprise a second GOA busline line group which extends along the first direction and is electrically connected to the corresponding GOA drive circuit; one end of the second GOA signal line group is electrically connected to the adjacent bonding line group, and another end of the second GOA signal line group is electrically connected to the second GOA busline line group; and the second GOA signal line group comprises at least a low voltage (VSS) line, a start trigger signal (STV) line, a reset signal line, and a low-frequency clock signal (LC) line.

12. The display panel according to claim 8, wherein the first test pad group comprises a first sub-test pad group and a second sub-test pad group; the second sub-test pad group is located between the first sub-test pad group and the second test pad group; the first lead group comprises a first sub-lead group connected to the first sub-test pad group and a second sub-lead group connected to the second sub-test pad group; the second lead group comprises a third sub-lead group connected to the first sub-test pad group and a fourth sub-lead group connected to the second sub-test pad group;

each of the bonding line groups is electrically connected to the corresponding second sub-test pad group through the adjacent second sub-lead group or the adjacent fourth sub-lead group; at least one of the bonding line groups is electrically connected to the corresponding first sub-test pad group through the adjacent first sub-lead group or the adjacent third sub-lead group; and the first sub-test pad group comprises at least one of a power supply voltage test pad, a low-frequency clock signal test pad, a first common electrode voltage test pad, and a start trigger signal (STV) test pad; and the second sub-test pad group is configured to connect source test signals.

13. The display panel according to claim 12, wherein the second test pad group comprises a first CK test pad group, a second common electrode voltage test pad, and a second CK test pad group which are sequentially spaced apart in the first direction; the third lead group comprises a first CK line group, a common electrode voltage line, and a second CK line group which are respectively electrically connected to the first CK test pad group, the second common electrode voltage test pad, and the second CK test pad group; and every two adjacent ones of the bonding line groups are electrically connected one-to-one to the first CK line group and the second CK line group in the corresponding test pad unit.

14. The display panel according to claim 13, wherein the source fan-out line groups comprise a first side and a second side arranged opposite to each other in the first direction; the fan-out region further comprises second GOA signal line groups respectively located on the first side and the second side; the bonding line groups comprise a first bonding line group near the first side, a second bonding line group near the second side, and a plurality of third bonding line groups positioned between the first bonding line group and the second bonding line group;

the first bonding line group is electrically connected to the second GOA signal line group located on the first side and is electrically connected to the corresponding first sub-test pad group through the adjacent first sub-lead group; the second bonding line group is electrically connected to the second GOA signal line group located on the second side and is electrically connected to the corresponding first test pad group through the adjacent third sub-lead group; the first bonding line group and the third bonding line groups are electrically connected to the corresponding second sub-test pad group through the adjacent second sub-lead group; and the second bonding line group is electrically connected to the corresponding second sub-test pad group through the adjacent fourth sub-lead group.

15. The display panel according to claim 8, further comprising a color filter plate and a liquid crystal layer, wherein the color filter plate is disposed on the counter substrate or the array substrate, and the liquid crystal layer is located between the array substrate and the counter substrate.

16. The display panel according to claim 8, further comprising multiple splicing units, wherein each of the splicing units comprises the counter substrate and the array substrate.

* * * * *